8739X
E Holton.
Grist Mill.
Patented Apr. 3, 1835.
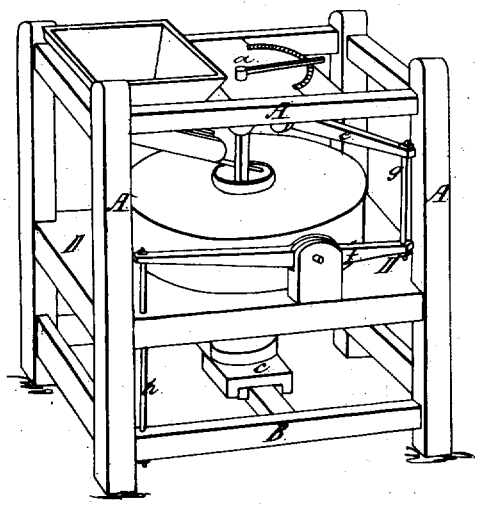

No. 11

Apl. 3. 1835 391.

Elisha Holton 8739X

Letters Patent

The Schedule referred to in these Letters Patent and making part of the same containing a description in the words of the said Elisha Holton himself of his improvement in the construction of a Grist Mill.

To all to whom these presents shall come Be it known that I Elisha Holton of Westminster in the County of Windham and State of Vermont have invented a new and useful improvement in the construction of a Grist Mill and that the following is a full and exact description thereof reference being had to the annexed drawing. A the frame of the Mill three feet and a half high by two and a half square and is made of Timber three inches and a half square. B. is a movable sill the tenon on one end of which is placed into a long mortise in one of the posts. in order thereby to raise and depress the spindle and runner by means of the bridge tree and box C. connected with it. D. is the floor supported by four rails one foot and six inches from the lower ends of the posts. two of these rails being six inches wide and each having a groove in its inner side in which another floor is supported. making a foundation for the bed stone; near the top of the posts. four other rails are framed in two of them supporting a plank ten or twelve inches wide. one edge of which covers the center of the stones. On this plank eight inches from the screw E. a semicircular rag. of cast iron is made fast, to receive in its notches the handle of the screw to keep it from turning. The hopper. shoe. curb. bridge tree. box. spindle, driver and balance beam, being arranged in the usual way. the stones should be one foot and eight inches in diameter. Here follows a description of

8739X of my invention or improvement for which a patent is desir
ed to be secured. 1st The mode of pressing the runner down
upon the bed stone. by means of turning down the screw
a. which operates in a cast iron oil box at the upper end
of the damsel. and that upon the balance beam in the eye
of the stone. 2nd The mode of raising the runner with the
same screw and the levers and rods connecting it with
the movable sill: The screw a. passes through the
lever c. and is kept there by a collar made fast to it be-
neath the lever; this lever extends to a point directly above
the end of the lever f. where they are connected by the rod
g. which passes through them; the levers each bearing upon
a shoulder at either end of the rod; the oposite end of the
lever f. is connected with the movable sill by the rod h.
which passes through the end of each the rod having a head
on one end, and a screw nut on the other, each lever hav
ing its fulcrum at such distance from the point where
the power is applied as will cause the box, spindle and
runner to rise and lower as the screw is raised and lowered
when turned which distance is one third the length of the
lever. The size and proportions of the whole may be vari
ed to suit the views and purposes of the constructor. —
Operation any of the powers usually made use of to propel
machinery may by means of a belt passing over the pul
ley above the box be applied to put the runner in mo
tion. after the grain is put into the hopper the runner
should be guaged to grind to the required fineness by turn
ing the screw above the damsel. Done this 23d day of March
1835. at Westminster Vt.

Elisha Holton

Witnesses
Henry Mellish
Luke A Wright

Exd,
W.G.C

[6600]

(Patented April 3rd 1835)

Drawing.